Sept. 4, 1951        C. A. LINDBERG        2,567,075
ELECTRIC TOASTER
Filed Oct. 1, 1945        4 Sheets-Sheet 1
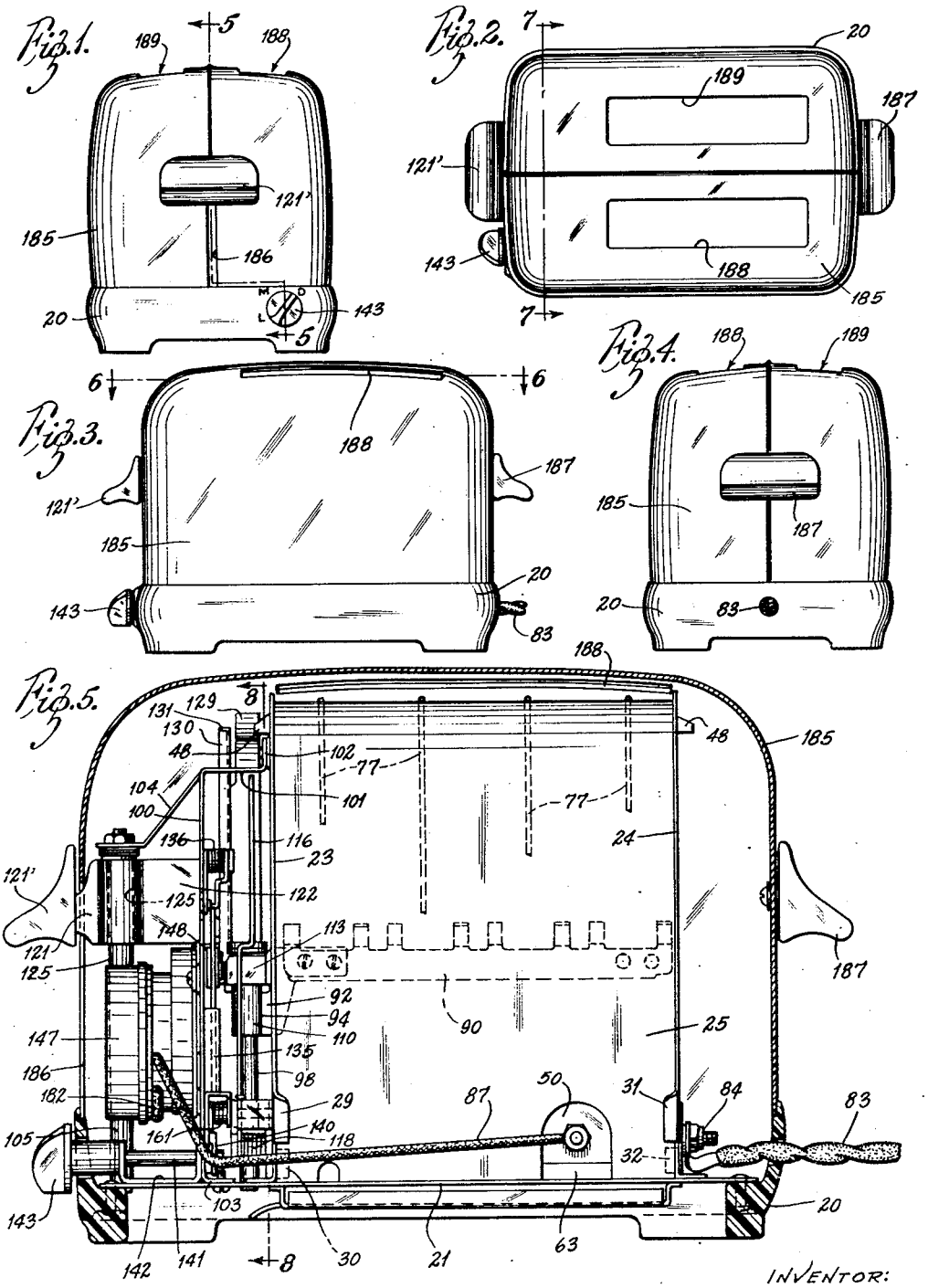
INVENTOR:
CARYL A. LINDBERG,
BY Jungeland, Rogers & Ezell
ATTORNEYS.

Sept. 4, 1951     C. A. LINDBERG     2,567,075
ELECTRIC TOASTER
Filed Oct. 1, 1945     4 Sheets-Sheet 2
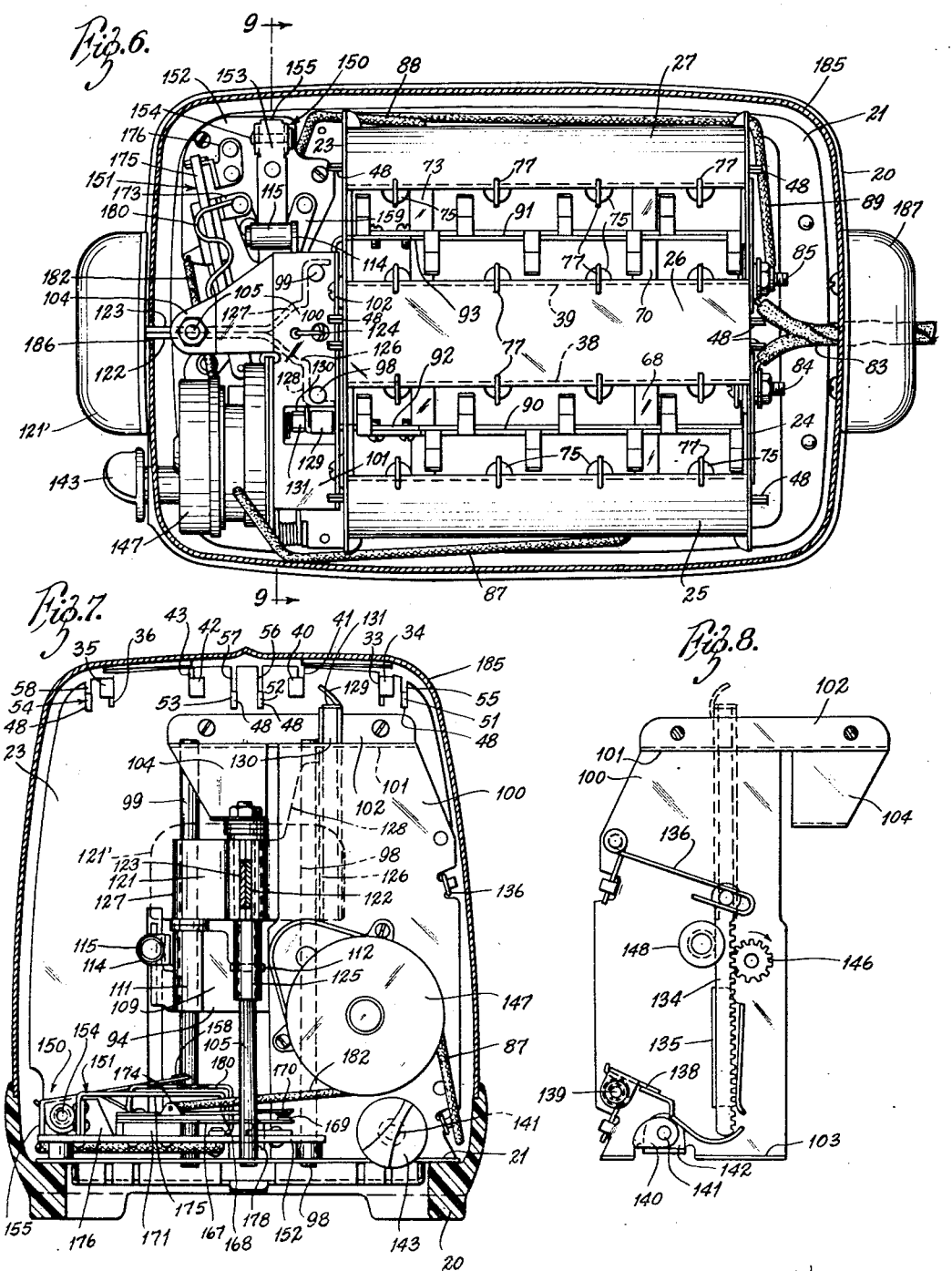
INVENTOR:
CARYL A. LINDBERG,
ATTORNEYS Sept. 4, 1951
C. A. LINDBERG
2,567,075
ELECTRIC TOASTER
Filed Oct. 1, 1945
4 Sheets-Sheet 3
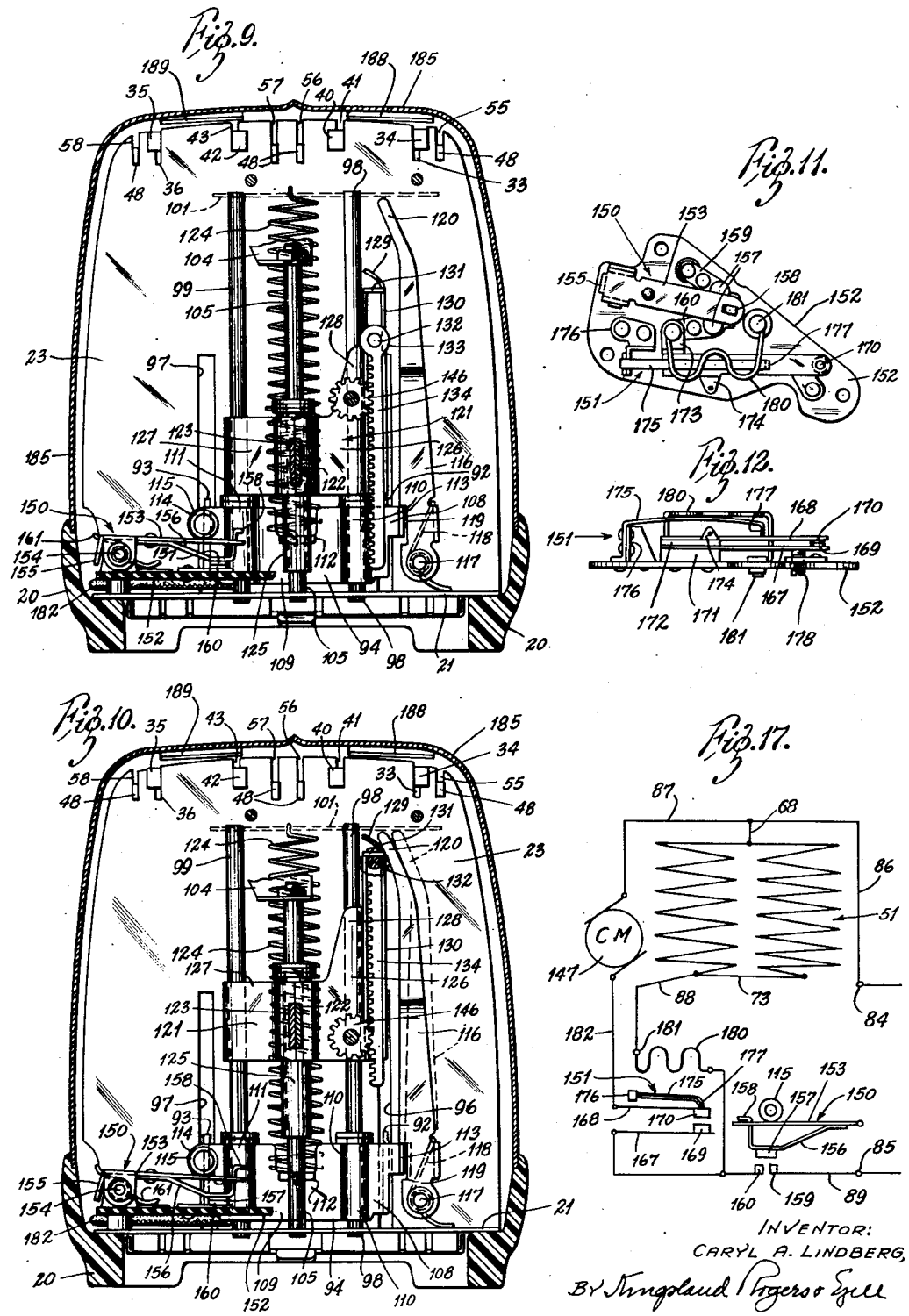
INVENTOR:
CARYL A. LINDBERG,
By Kingsland Rogers & Ezell
ATTORNEYS.

Sept. 4, 1951 C. A. LINDBERG 2,567,075
ELECTRIC TOASTER
Filed Oct. 1, 1945 4 Sheets-Sheet 4
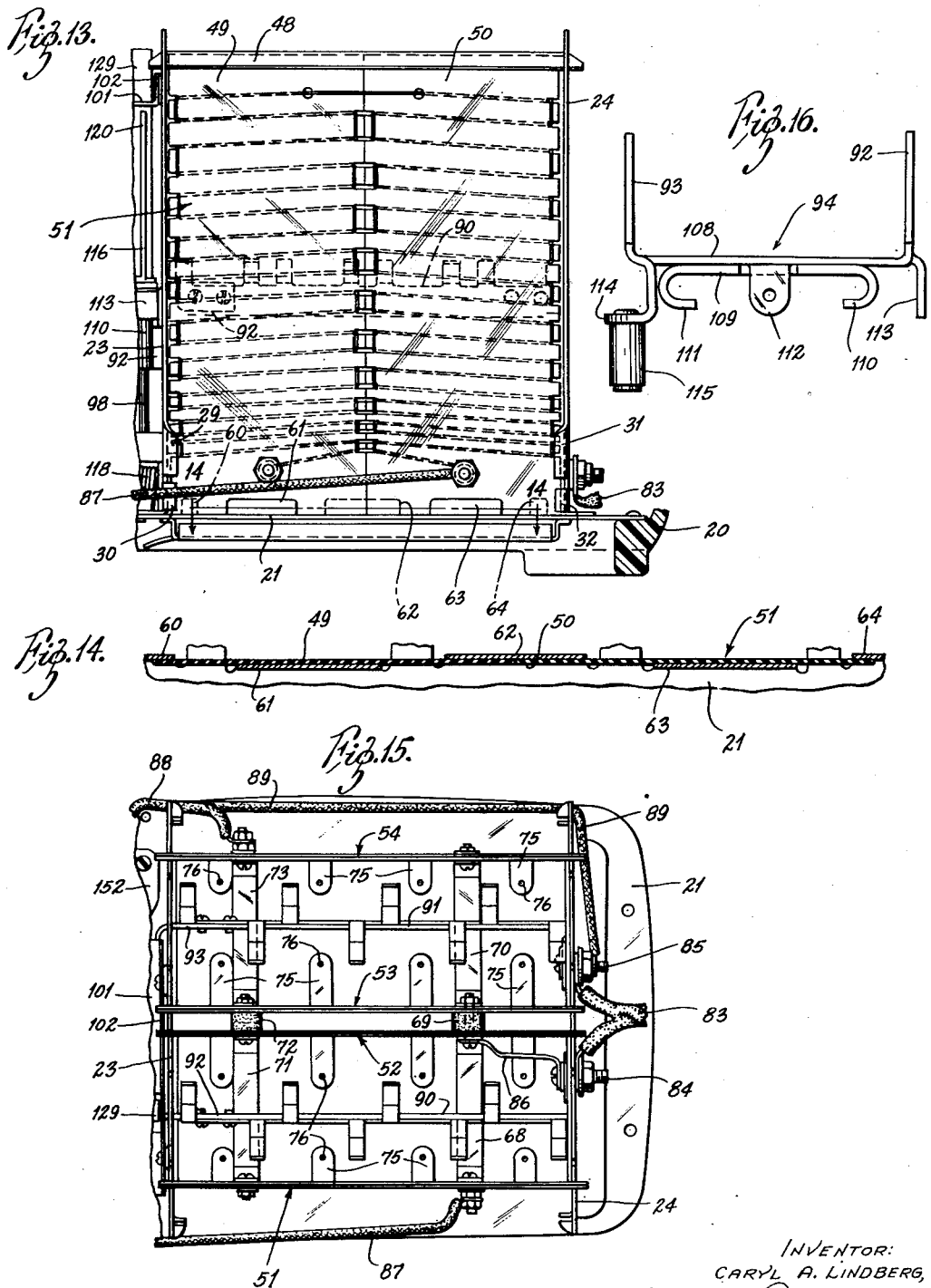
INVENTOR:
CARYL A. LINDBERG,
BY Kingsland Rogers & Ezell
ATTORNEYS.

Patented Sept. 4, 1951

2,567,075

UNITED STATES PATENT OFFICE 2,567,075

ELECTRIC TOASTER

Caryl A. Lindberg, Glendale, Mo., assignor to The Emerson Electric Manufacturing Company, St. Louis, Mo., a corporation of Missouri Application October 1, 1945, Serial No. 619,639

9 Claims. (Cl. 99—328)

The present invention relates to an electric toaster. Certain features will be capable of use in connection with other heating, or like, devices requiring timing means.

It is an object of the invention to provide a toaster having a thermostatically controlled mechanism having a very simple operating cycle to compensate for the difference in time required to do a toasting operation when the toaster starts out cold, from that required when the toaster starts out hot.

More particularly, it is an object of the invention to provide a toaster having a fixed timing period, preceded by a thermostatically controlled variable timing period, the variation of which is a function of the heat of the toaster at the start of the toasting operation.

It is a further object of the invention to provide the foregoing control with means for regulating the time of the toasting operation so as to obtain dark, medium or light toast.

A further object of the invention is to provide a control of the foregoing kind wherein the thermostatic control is effected by a relay operation.

A further object is to provide such a toaster control that automatically accommodates variations in voltage.

A further object of the invention is to provide a toaster control of the foregoing type wherein the fixed timing period is determined by an electric motor, and particularly a constant speed electric motor.

A further object of the invention is to provide a toaster of this kind wherein the control mechanism may be entirely located outside of the toasting chamber.

Further objects include the provision of control mechanism and toaster supporting mechanism that may be readily manufactured and easily assembled.

In the drawings:

Fig. 1 is an end view of the toaster;

Fig. 2 is a plan view thereof;

Fig. 3 is a side elevation;

Fig. 4 is an end elevation from the end opposite Fig. 1;

Fig. 5 is a vertical longitudinal section taken on the broken line 5—5 of Fig. 1;

Fig. 6 is a horizontal section taken at the top on the line 6—6 of Fig. 3;

Fig. 7 is a vertical transverse section through the control parts taken on the line 7—7 of Fig. 2;

Fig. 8 is a fragmentary section of part of the trip mechanism taken on the line 8—8 of Fig. 5;

Fig. 9 is a transverse section taken on the line 9—9 of Fig. 6 showing the toaster in the process of heating;

Fig. 10 is a view similar to Fig. 9 showing the toaster at the point of release;

Fig. 11 is a plan view of the switch mechanism;

Fig. 12 is a side elevation of the switch mechanism;

Fig. 13 is a fragmentary side elevation, partly in section, with certain parts removed;

Fig. 14 is a section on the line 14—14 at the bottom of Fig. 13;

Fig. 15 is a plan view of the parts in Fig. 13;

Fig. 16 is a plan view of part of the bread supporting rack; and

Fig. 17 is a wiring diagram of the toaster.

The toaster includes a base 20, preferably formed from plastic material. This base is in the general shape of an open rectangle. On its inner surface it is provided with a ledge to receive a base plate 21. This base plate or platform 21 is held elevated by the base 20 and provides the means upon which the various mechanical elements of the toaster are supported.

The toaster is provided with two toasting compartments and a control compartment. The control compartment is separated by a transverse partition 23 rising from the platform 21 at a distance inwardly from one end thereof. There is an opposite partition 24 also supported from, and extending upwardly from, the platform 21. Extending between the two partitions 23 and 24 are a plate 25, a plate 26 and a plate 27. The plates 25 and 27 are the same. It will be seen by particular reference to Figs. 5, 13 and 14, that the partition 23 has adjacent its lower edge two inturned ears 29 and 30. The partition 24 has similar ears 31 and 32. The ears 30 and 32 are offset backwardly from the ears 29 and 31 a distance approximately equal to the thickness of the sheet forming the plate 25. At their upper edges the plates 23 and 24 have identical slots 33 extending downwardly. These slots receive ears 34 that extend outwardly from the upper edges of the plate 25 and are turned at 90°. It thus may be seen that the plate 25 may be slipped down so that the lower extremes of its two side edges engage back of the two ears 29 and 31 and forwardly of the two ears 30 and 32, while the two ears 34 on its upper edge are engaged in the slots 33 of the two partitions 23 and 24. The engagement of the ears 34 in the slots 33 thereby stabilizes the plates against rocking movement, and the partitions 23 and 24 against endwise rocking.

The plate 27 is similarly located between the opposite edges of the partitions 23 and 24; and the partitions have similar ears 35 received in similar slots 36.

The plate 26 divides the upper opening between the edges of the plates 25 and 27 and the two partitions into two bread-receiving slots. This plate has downturned side flanges 38 and 39. At the opposite ends of the flange 38, two bent-over ears 40 project and are engageable within slots 41 in the partitions 23 and 24. The flange 39 of the plate 26 has similar ears 42 that engage in slots 43.

By the foregoing construction, the plates 25, 26 and 27 may all be withdrawn by simply lifting them upwardly after the outer cover of the toaster is removed. The plates and partitions mutually stabilize each other.

This toaster is provided with four heating elements. Actually each of the elements comprises a double heating unit. As they are identical, a description of one will suffice for all. Each unit has a metal rib 48 across its top edges in the form of a longitudinally overlapped strip. Suspended by the rib 48 are the two sheets 49 and 50 of insulating material such as mica, upon the inner surfaces of which are wound the heating coils.

The several heating elements are designated at 51, 52, 53 and 54. The heating element 51 has its rib element 48 suspended between the partitions 23 and 24 by engagement within a first pair of slots 55 in the two partitions. In similar manner the second heating unit 52 is mounted in slots 56; the third element 53 in slots 57; and the fourth element 54 in slots 58. It will be seen that the heating element 51 is beneath the overhanging top part of the plate 25. The two middle heating elements 52 and 53 are disposed under the plate 26, and the heating element 54 is disposed under the plate 27.

The bottom plate 21 has turned-up lugs to engage on opposite sides of the bottom edges of the several heating elements. Thus, referring particularly to the heating element 51 (Figs. 13, 14), it will be seen that the plate 21 has a first lug 60 upstruck to be engaged by the inner surface of the heating element. Next, there is a lug 61 that engages the outer surface. Then, a lug 62 engages the inner surface, and, similarly, the lugs 63 and 64 engage the outer and inner surfaces respectively. All of the several heating elements are held in like manner at their bottom edges. They may, therefore, be inserted into the toaster very readily from the top side thereof.

The two heating units 49 and 50 of each heating element are connected in series. The current path is from the lower corner of the unit 50 upwardly to its top, then across to the top of the adjacent unit 51, and down to the bottom thereof. The four heating units are connected in parallel. To this end a jumper 68 is connected between the inlet terminals of the two heating elements 51 and 52, the jumper being screwed to both elements. The screw that attaches the jumper 68 to the element 52 passes through a spacer 69 and then acts also to hold a jumper 70 to the heating element 53, at the same time attaching the elements 52 and 53 together electrically. The jumper 70 is also attached by a screw to the element 54.

In similar fashion a jumper 71 connects the outgoing leads of the heating elements 51 and 52. One end of it is connected by a screw that passes through a spacer element 72 into another jumper 73, which, in turn, is connected to the other heating element 54. All of the various leads are brought to these connections with the jumpers.

The bottom plate 21 likewise has outstanding horizontal fingers 75 projecting outwardly into each toast well from the edges thereof. All of these fingers are provided with small holes 76 therethrough. Aligned holes appear in the edges of the plates 25, 26 and 27. Grid bars 77, hooked over at one end, may be dropped into these aligned holes.

The principal electrical connections through the toasting compartments comprise a main intake cable 83, the two leads of which are connected to terminals 84 and 85 on the partition 24 (Fig. 15). The terminal 84 is connected by a lead 86 with the terminal by which the jumper 68 is joined to the jumper 70, and the inlet sides of the several heating elements are connected. Outside of the heating element 51 the jumper 68 also carries a lead 87 for a purpose that will appear.

The outlet ends of the heating elements are connected by a lead 88, attached outside the heating element 54, with the jumper 73.

The other main terminal 85 on the partition 24 is connected by a lead 89 which extends into the control mechanism for purposes that will appear.

It will be seen that all of the elements thus far described in connection with the toasting compartments may be readily removed. The plates 25, 26 and 27 are liftable away. The electrical connections may be unscrewed, and thereafter all of the electrical parts may be lifted upwardly and withdrawn.

The toaster is of the pop-up type. There is a vertically reciprocable bread support extending into each of the two toasting compartments. These bread supports comprise two cantilever beams 90 and 91 having a plurality of lugs projecting from opposite sides of the top edge thereof, the lugs providing a means to support the slices of bread.

The two beams 90 and 91 are secured to the projecting ends 92 and 93, respectively, of a toast-rack support generally indicated at 94, the main part of which is disposed outside of the partition 23. This rack is shown separately in Fig. 16. The partition is slotted at 96 and 97, respectively, so that the two arms 92 and 93 may pass therethrough and reciprocate vertically. Immediately back of the partition 23 are disposed two vertical rods 98 and 99. These rods have reduced portions forming shoulders at their lower ends, the reduced portions passing through holes in the plate 21. At their tops, the rods 98 and 99 are similarly provided with reduced portions to pass through a horizontal ledge 101 on a bracket 100. This bracket has a vertical ledge 102 which extends upwardly from the ledge 101 on this bracket and receives screws by means of which the bracket is secured at its upper end to the partition 23. The lower end of the bracket has an inturned flange 103 that rests on the upper surface of the bottom plate 21 and is screwed thereto.

The bracket 100 likewise has a downwardly and outwardly extending projection 104 to which is bolted the upper end of a third rod 105. The bottom end of this third rod passes through and is secured into the bottom plate 21.

As heretofore mentioned, the toast-rack support 94 (Fig. 16), consists of a more or less H-shaped member. The two legs 92 and 93 thereof extend into the toasting compartments and support the cantilever members 90 and 91. These two arms 92 and 93 are joined by a connecting part 108. The connecting part is welded to a slide bracket 109, the ends of which are rolled over at 110 and 111 to embrace the two vertical rods 98 and 99, respectively. The slide bracket also has a horizontal ear 112 for a purpose to be described. The toast-rack support has a latching arm 113 projecting backwardly from the arm 92. It also has a switch-operating arm 114 projecting backwardly from the rack-supporting arm 93. This arm 114 supports a roller 115 mounted on a suitable pivot.

A coil spring 124 is attached at the top to the horizontal ledge 101 of the bracket 100. At its bottom, this coil spring is engaged in the ear 112 of the bracket 94. This spring applies to the toast-rack support a constant upward force.

A latching lever 116 (Figs. 9, 10) is pivotally mounted at 117 to the lower part of the partition 23. A torsion spring 118 constantly urges the latching lever 116 counterclockwise. The lever 116 is notched at 119 to receive the latching ear 113 on the toast-rack support, to hold the rack in its lowered position against the upward pull of the coil spring 124. The trip or latching lever 116 is also bent over somewhat at its upper end at 120. As will appear, this puts the upper end of the lever in line with a trip mechanism.

An actuating arm 121 is provided for lowering the toast rack and for releasing the trip. This arm is formed of two stampings 122 and 123. These stampings are shaped to support a vertical bearing sleeve or bushing 125 which surrounds the rod 105 so that the actuating arm is guided for vertical movement thereon. The two members 122 and 123 extend outwardly beyond the rod 105 and have attached thereto a handle 121'.

Opposite the handle, and on the inside of the rod 105, the two members extend toward the partition 23, and then diverge in two arms 126 and 127 that extend partly around the two rods 98 and 99. It will be seen that, when the handle 121' is depressed, the actuating arm 121 slides down on the rods, and its inner arms 126 and 127 engage the curled arms 110 and 111 of the toast supporting bracket 94 to cause the bracket to move downwardly.

The actuating member 121 adjacent its arm 126, has an upwardly extending extension 128. This extension 128 has a trip actuating ear 129 adjacent the top part thereof. This ear 129 is adapted to come into contact with the overhanging end 120 of the latching lever 116, as appears in Fig. 10. On the side of this upwardly projecting part of the actuating arm, outwardly from the partition 23, there is a gear rack receptacle 130. This receptacle is in the form of a channel, with its open side outwardly. It is closed at its upper end 131. It receives a pin 132 that projects from a head 133 on a rack bar 134 (Figs. 8-10). This rack bar 134 is guided within a track 135 on the inner surface of the bracket 100 (Fig. 8). A torsion spring 136 supported on the bracket acts against the pin 132 and urges the rack bar 134 downward.

The lowermost position of the rack bar 134 is determined by an adjustment arrangement, as appears in greatest detail in Fig. 8. A lever 138 is pivoted at 139 to the bracket 100. The lever engages a cam 140 that is also pivoted to the bracket 100. The lever receives and supports the bottom end of the rack bar 134 and delimits its downward movement. When the cam 140 is adjusted, it will move the lever 138 to shift the rack bar upwardly or permit it to descend under the influence of the spring 136, to preset the initial or starting position of the bar. This cam is supported on a shaft 141 (Fig. 5), which shaft is mounted in a U-shaped bracket 142 welded onto the base plate 21. An adjusting handle 143 is provided to rotate the shaft 141. This handle passes through a suitable opening in the base 20.

The rack 134 is in mesh with a pinion 146 that is supported in the bracket 100. This pinion is driven by a constant speed electric motor 147, preferably through gearing. The motor 147 is attached to the outer surface of the bracket 100. An idler wheel 148 holds the rack against the pinion.

A main switch, generally indicated at 150, and a thermostatic switch, generally indicated at 151, are mounted together on the plate 21 outside the partition 23. They are shown separately in Figs. 11 and 12.

These switches are both mounted on an insulating plate 152 supported, by screw attachment, in spaced relation above the bottom plate 21 of the toaster. The switch 150 includes a main arm 153 (Figs. 9-12), having downturned ears at one end. These lie along opposite sides of corresponding upturned ears on a pivot bracket mounted on the plate 152, and a pivot pin 154 passes through them all. By this means, the arm 153 is pivotally mounted on the base plate 152. The end 155 of the blade 153 is downturned so that it may engage the base plate 152 and limit upward pivotal movement of the outer end of the switch blade, as shown in Fig. 7.

The blade 153 carries a spring contact blade 156 attached at one end to the blade 153, and is bowed down between its ends to support a transversely disposed double contact armature 157. The outer end of the contact blade has a tongue 158 projecting through the outer end of the blade 153, to permit the outer end of the spring blade to move toward the switch blade 153, but to have limited movement away from it. This accommodates override of the downward pivotal action of the blade 153.

The contact armature 157 is adapted to bridge across two fixed contact terminal elements 159 and 160 supported on the base plate 152.

The blade 153 is located so as to be acted upon by the roller 115 on the toast rack support 94 as the latter approaches and reaches its lowermost position. At the position in which the latch bar 116 holds the toast rack support in its lowermost position (Fig. 10), the armature 157 is closed across the contacts 159 and 160. A torsion spring 161 around the pivot 154 of the blade 152 urges it counterclockwise to open the contacts.

The thermostatic switch 151, also mounted on the insulating plate 152, has two spring switch blades 167 and 168. They have contacts 169 and 170, respectively. Normally, these contacts are sprung apart. The two blades 167 and 168 are mounted in spaced relationship on the base 152 by insulating spacers 171 and 172. The blade 167 is electrically joined to the contact 160 of the main switch by a jumper 173. The blade 168 is provided with a terminal connector 174.

The contact blades 167 and 168 are adapted to be actuated by a bimetal member 175. This member is shown as being generally U-shaped.

One end is attached to a supporting bracket 176 that is mounted upon the base plate 152.

This bimetal has a free end 177 that extends down above the blade 168 so that when the bimetal bows downwardly the end 177 will push the blade 168 toward the blade 167 to bring contacts 169 and 170 together. Downward movement of the blades is limited by an adjustable screw 178, extending upwardly from the base 152 and insulatedly supported thereon. This screw will determine the amount of heating of the bimetal required to close the contacts. The inherent spring of the blade 167 will keep it in contact with the head of the screw 178.

The bimetal is arranged to be heated by a heater 180 extending over the bimetal. This heater has downturned legs, one of which is united with the jumper 173, and the other one is attached to a terminal 181.

The previously mentioned lead 87 (Figs. 6, 7, 15 and 17) is connected to the clock motor 147. The other side of the clock motor is connected by a lead 182 to the connector 174 of the bimetal switch blade 168. The lead 88 (Fig. 15) connects the jumper 73 and the outlet terminals of the heater elements, to the terminal 181 of the bimetal heater 180. The lead 89 is connected to the terminal contact 159 of the main switch.

An outer cover 185, open at the bottom, encloses the operating mechanism. This cover has a slot 186 through which the actuating arm 121 extends to dispose the handle 121' outside the casing. A handle 187 is secured to the opposite end of the casing. Two bread-receiving openings 188 and 189 are provided in the top of the casing. The cover is removably secured to the base 20.

Operation

When it is desired to use this toaster, one or two pieces of bread are put into the toasting compartments upon the racks 90 and 91. Thereupon, the handle 121' is depressed. It carries the actuating arm 121 downwardly, the same riding on the outer rod 195. The inwardly projecting arms 126 and 127 of the actuator, that extend around the two inner rods 98 and 99, engage over the bearing flanges 110 and 111 of the toast rack support reciprocably mounted upon these two rods. Consequently, the toast rack support is forced downwardly upon depression of the handle 121'.

As the actuating member descends, the trip arm 129 thereof passes under the overhanging end 120 of the latching lever 116, so that the latching lever can move inwardly under the influence of the torsion spring 118 to hold its inner edge in contact with the latching ledge 113 of the toast rack support 94. When the toast rack support is lowered to the bottom, this latching arm 113 will be received in the notch 119 on the lever 116 and the latching lever 116 will be moved counterclockwise by the spring 118 to hold the toast rack support in its lower position.

As the toast rack support 94 reaches its lower position, the switch actuating roller 115 thereon engages the arm 153 of the starting switch 150 and pivots the same clockwise (Fig. 10) against the spring 161 to cause the armature 157 to bridge the contacts 159 and 160, and to hold them bridged as long as the toast rack support is latched in its lower position.

From a cold start, the bimetal 175 is in a cold position so that the switch contacts 169 and 170 are separated. Reference to Fig. 17 will show that, under these circumstances, the heating coils are in circuit in series with the heater 180 and the switch 150. Therefore, the heaters will start to cook the bread and to heat the cooking compartments, and the heater 180 will heat the bimetal to urge the contact 170 toward the contact 169.

After a period of time required to heat the cooking compartments, the bimetal 175 will be so influenced by the heater 180 that it will move the contacts 169 and 170 together. This will close the circuit to the motor 147, which then starts to operate and to lift the rack 134 upwardly. This upward movement will cause the pin 132 attached to the top of the rack to move upward until it engages the top closure 131 of the channel 130 on the actuating member 121. After this engagement has been made, further movement of the motor 147 and consequent further lifting of the rack will displace the actuating member 121 upwardly. After a predetermined time, during which such upward movement continues, the release member 129 will engage the overhanging portion 120 of the trip lever 116 and will move the trip lever counterclockwise, to release the notch 119 from the latching arm 113 on the toast rack support 94. Thereupon, the distended coil spring 115 will snap the toast rack support upwardly and bring the toast sufficiently out of the top of the toaster so that it may be removed. At the same time, the toast rack support will release the switch 150 and disconnect the entire toaster mechanism from any operating circuit. The motor 147 will be deenergized, and the rack 134 depressed to its starting position by the spring 136.

During such time as the toaster is inoperative, the bimetal 175 can cool. However, it remains in circuit throughout the operating periods of the toaster, and after a very few operations, or, after one operation, if desired, this bimetal 175 will hold the contacts 169 and 170 closed during any ordinarily brief period between successive toasting operations. It has been found that once the toaster has become heated, it cools down so slowly that there is no practical need for any adjustment of the initial thermostatically controlled starting portion of the toasting cycle. Consequently, upon a successive toasting operation, with the two contacts 169 and 170 closed at the start, the motor 147 will be started as soon as the handle 125 is depressed and the main switch 150 closed.

To adjust the darkness of the toast, the knob 143 may be turned to change the starting position of the rack bar. If this starting position is elevated, a lesser number of rotations of the motor, and hence a shorter period of time is required to effect release of the latch mechanism.

The selection of the proper warming-up time is effected by adjustment of the screw 178 on the switch 151. Lowering of this screw increases the heat required to bend the bimetal 175 sufficiently to close the switch, and hence increases the heating time required before the motor can start. This adjustment is ordinarily made at the factory, by determining the time required to bring the toasting compartments up to a steady temperature.

The use of the relay consisting of the heater 180 and its bimetal switch automatically accommodates voltage variations, as the time required to close the bimetal switch is a function of voltage, as is the time required to toast the bread.

The parts are all capable of quick assembly and disassembly. When the casing 185 is removed, the control compartment is readily accessible. The grid wires 77 are held in by the casing, and may be lifted out upon its removal. There are no controls in the toasting compartment, the warming-up control being operated primarily as a function of time of operation. The switches are easily detached by unscrewing the plate 152 from the base plate 21. The actuating mechanism may be removed by detaching the rod 105 from the extension 104. The clock motor is screwed to the bracket 100. The latch and power elements are immediately accessible upon unscrewing of the bracket 100, which also releases the rods 98 and 99, and the associated parts of the toast rack support.

The plates 25, 26 and 27 may be lifted out, after the cover 185 is removed. The heating elements may be lifted out thereafter, when the electrical connections are unscrewed. The two toast supporting racks 90 and 91 may be unscrewed from the toast rack support after the heating elements are removed.

What is claimed is:

1. In a timing mechanism for a toaster which includes a toast rack mounted for movement between an operative position and a released position, and trip means releasably maintaining the toast rack in the operative position, an actuator reciprocably movable between first and second positions, the actuator actuating the trip means when in the first position so as to release the toast rack from the operative position, a motor, a member driven by the motor to move the actuator from second to first position, said member being mounted for movement relative to the actuator without engaging it, but engageable with the actuator when the latter is in second position to move it to first position, means to adjustably limit the initial position of the member relative to the actuator, and means to control the start of the motor.

2. In a toaster or the like, a food support movable from a determined released position to a determined captive cooking position, a heating element for cooking food when the support is in cooking position, a main switch, a timing device, and a heat-responsive switch operable as a function of heat generated by the heating element and closed upon becoming heated; means to close the main switch when the food support is moved to cooking position; means operated by the timing device after a predetermined period of operation thereof to release the food support from the captive position and open the main switch; a first circuit branch including the main switch and the heating element; and a second circuit including the timing device and heat-responsive switch; the means operated by the timing device including an element movable between a set position and a trip position; means automatically moving it from the trip position to the set position when the main switch is opened, the timing device moving it from the set position to the trip position to release the food support from the captive position; and means to adjust the set position of said element relative to its trip position so as to preselect the distance it must travel under the action of the timing device to release the food support and open the main switch.

3. In a mechanism of the kind described, a constant speed timing motor, a releasing member driven by the motor from a predetermined first position to a predetermined second position, means to vary the said first position and hence to adjust the time required to move the releasing member to its second position, an actuator movable from a released to an operated position, a device moved from first to second position by the movement aforesaid of the actuator, latch means holding the device in second position, the releasing member being operated by the motor and moved toward the latch means to release the same when the releasing member reaches its second position.

4. In a toaster or the like, a food support movable from released to cooking position and time-controlled mechanism for moving the support to released position; a latch device engageable to hold the food support in cooking position, a normally inoperative timing motor having a releasing member operable upon the operation of the motor to move from a starting position to a position wherein it engages said latch device to displace it and release the food support, spring means yieldably urging the release device into its starting position; and means dependent upon movement of the food support into cooking position to start the timing motor.

5. In a toaster or the like, a food support movable from released to cooking position and time-controlled mechanism for automatically moving the food support back to released position; a latch engageable to hold the food support in cooking position; a timing motor; actuating means independent of the motor for moving the food support between the cooking position and the released position whereby the support may be manually moved without operation of the timing motor, means dependent upon moving of the food support to cooking position to start the motor, a releasing member moved from its starting position by the motor to release the latch after operation of the motor for a predetermined time so as to release the food support to cause it to move to its released position, and means automatically returning the releasing member to its starting position after it has released the latch.

6. In a toaster or the like, a food support movable from released to cooking position and time-controlled mechanism for moving the support back to released position; a latch engageable to hold the food support in cooking position; a timing motor independent of the support whereby the support may be manually moved without operation of the timing motor, means dependent upon moving of the food support to cooking position to start the motor, a releasing member moved by the motor to cause the release of the latch after operation of the motor for a predetermined time, means automatically returning the releasing member to its starting position after it has released the latch; means to adjust the starting position of the releasing member to vary the time interval between start of the motor and release of the latch; manual actuating means displaceable from a starting to a second position and engageable with the food support to displace it to its cooking position, said means being movable relatively to the food support, the latch having a portion thereof displaced by its movement into latching position and into the path of the actuating means when the latter is returned to its starting position, the actuating means being engageable by and displaceable by the releasing member so as to be returned to its starting position by said member, said displacement of the actuating means causing release of the latch.

7. In a toaster or the like, a food support movable from release to cooking position, and back, a correspondingly movable actuator engageable with the food support to produce movement of the support to cooking position, a latch movable into latching engagement with the food support in cooking position, which movement displaces a portion of the latch into the path of the actuator returning to its release position, whereby manual return of the actuator will release the latch; and means to return the actuator after a predetermined time, including a motor the energization of which depends upon operation of the food support to cooking position, a release member moved by the motor in the direction of movement of the actuator to release the latch and engageable with the actuator in the cooking position of the latter to move the actuator toward release position, the release member having an initial position relative to the actuator, and means for varying this initial position to vary the distance the release member must move to effect release of the latch in the manner aforesaid.

8. A toaster, including a food support movable between a released position and a cooking position; yieldable means urging the food support toward the released position; latch means for holding the food support in the cooking position, said latch means including a pivotally mounted lever member; an actuating member movable to pivot the lever member and release the latch means; a rack segment movable relative to the actuating member, the rack segment and the actuating member containing interengaging means for causing the actuating member to move with the rack segment when they attain a predetermined relative position; means for varying the initial position of the rack segment relative to the actuating member; yieldable means urging the rack segment away from engagement with the actuating member when the rack member is in its initial position; and a constant speed motor for moving the rack segment toward engagement with the actuating member.

9. A toaster, including a food support movable vertically between a released position and a cooking position; yieldable means urging the food support toward the released position; latch means for holding the food support in the cooking position including an upwardly extending pivotally mounted lever member; an actuating member mounted above the food support and movable into contact therewith for forcing it from the released position to the cooking position, the actuating member being freely movable relative to the food support and containing a vertically extending slot therein; a rack segment mounted for vertical movement and containing a projection disposed in the slot in the actuating member; means for adjustably limiting the downward movement of the rack segment so as to vary the position thereof relative to the actuating member; a constant speed motor for moving the rack segment upwardly; interengaging means between the rack segment and the actuating member whereby the latter is moved upwardly with the rack segment; and means on the actuating member to contact the upper end of the lever member to pivot it so as to release the latch means, the actuating member also being manually movable to contact the upper end of the lever member.

CARYL A. LINDBERG.

REFERENCES CITED

The following references are of record in the file of this patent:

UNITED STATES PATENTS

| Number | Name | Date |
| --- | --- | --- |
| 1,900,831 | Marter | Mar. 7, 1933 |
| 1,971,058 | Walder | Aug. 21, 1934 |
| 2,001,362 | Ireland | May 14, 1935 |
| 2,009,601 | Anderson | July 30, 1935 |
| 2,070,129 | Ireland | Feb. 9, 1937 |
| 2,101,062 | Graham | Dec. 7, 1937 |
| 2,151,401 | Belcher | Mar. 21, 1939 |
| 2,182,124 | Guerra | Dec. 5, 1939 |
| 2,185,638 | Anderson | Apr. 2, 1940 |
| 2,207,947 | Sardeson | July 16, 1940 |
| 2,217,450 | Newell | Oct. 8, 1940 |
| 2,236,395 | Biebel | Mar. 25, 1941 |
| 2,236,405 | Ireland | Mar. 25, 1941 |
| 2,266,014 | Erickson | Dec. 16, 1941 |
| 2,294,695 | Sardeson | Sept. 1, 1942 |
| 2,336,696 | McCullough | Dec. 14, 1943 |
| 2,347,611 | Purpura | Apr. 25, 1944 |
| 2,359,580 | Poole | Oct. 3, 1944 |
| 2,364,175 | Turner | Dec. 5, 1944 |
| 2,361,078 | Anderson | Oct. 24, 1944 |
| 2,379,709 | Heilman | July 3, 1945 |
| 2,402,576 | Purpura | June 25, 1946 |